(12) United States Patent
Ali et al.

(10) Patent No.: US 8,575,073 B2
(45) Date of Patent: Nov. 5, 2013

(54) SLICKWATER TREATMENT FLUID AND METHOD

(75) Inventors: Syed Ali, Sugar Land, TX (US); Leiming Li, Sugar Land, TX (US); Lijun Lin, Sugar Land, TX (US); Paul R. Howard, Sugar Land, TX (US); Curtis L. Boney, Houston, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 644 days.

(21) Appl. No.: 12/143,105

(22) Filed: Jun. 20, 2008

(65) Prior Publication Data

US 2009/0318313 A1 Dec. 24, 2009

(51) Int. Cl.
*C09K 8/62* (2006.01)

(52) U.S. Cl.
USPC ........... 507/225; 507/120; 507/131; 507/226; 507/244; 507/269; 166/305.1

(58) Field of Classification Search
None
See application file for complete search history.

(56) References Cited

U.S. PATENT DOCUMENTS

| | | | |
|---|---|---|---|
| 3,442,803 A | 5/1969 | Hoover et al. | |
| 6,702,023 B1 | 3/2004 | Harris | |
| 6,763,888 B1 | 7/2004 | Harris | |
| 6,915,854 B2 | 7/2005 | England | |
| 7,287,593 B2 | 10/2007 | Hutchins | |
| 7,318,474 B2 | 1/2008 | Welton | |
| 7,615,518 B2 * | 11/2009 | Perry et al. | 507/269 |
| 2007/0117723 A1 | 5/2007 | Carpenter | |
| 2007/0204997 A1 | 9/2007 | Harris | |
| 2007/0284101 A1 | 12/2007 | Valeriano | |
| 2008/0017382 A1 | 1/2008 | Harris | |
| 2008/0066909 A1 | 3/2008 | Hutchins | |
| 2008/0099207 A1 | 5/2008 | Venditto et al. | |
| 2008/0173452 A1 * | 7/2008 | Sanders et al. | 166/308.2 |
| 2008/0176770 A1 * | 7/2008 | Sanders et al. | 507/213 |

FOREIGN PATENT DOCUMENTS

GB 2420577 5/2006

* cited by examiner

*Primary Examiner* — John J Figueroa
(74) *Attorney, Agent, or Firm* — Jeremy D. Tillman; Daryl R. Wright; Tim Curington

(57) ABSTRACT

A treatment fluid for treating a subterranean formation penetrated by a wellbore is formed from water, a polyacrylamide in an amount of less than about 0.5% by weight of the fluid for reducing friction of the fluid and a stabilized peroxide breaker. A method of treating a subterranean formation penetrated by a wellbore is carried out by forming treatment fluid comprising water, a polyacrylamide in an amount of less than about 0.5% by weight of the fluid for reducing friction of the fluid and a stabilized peroxide breaker. The treatment fluid is introduced into the formation through the wellbore at a pressure above the fracture pressure of the formation.

11 Claims, 5 Drawing Sheets

SLICKWATER TREATMENT FLUID AND METHOD

BACKGROUND

The statements in this section merely provide background information related to the present disclosure and may not constitute prior art.

In the production of hydrocarbons from wells in subterranean formations, the formations are often stimulated to facilitate increased production of hydrocarbons. One method of stimulation is to hydraulically fracture the formation by introducing a fluid, known as a fracturing fluid or "frac fluid," into the formation through a wellbore and against the surface of the formation at a pressure sufficient to create a fracture or further open existing fractures in the formation. Usually a "pad fluid" is first injected to create the fracture and then a fracturing fluid, often bearing granular propping agents, is injected at a pressure and rate sufficient to extend the fracture from the wellbore deeper into the formation. If a proppant is employed, the goal is generally to create a proppant filled zone (aka, the proppant pack) from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected. These methods of fracturing are well known and they may be varied to meet the user's needs, but most follow this general procedure.

The fluids used as fracturing fluids in such formations are typically fluids that have been "viscosified" or thickened, which facilitates fracturing and proppant transport. Viscosification of the fluid may be achieved through the addition of natural or synthetic polymers (cross-linked or uncross-linked). The carrier fluid is usually water or a brine that is viscosified with the viscosifying polymer, such as a solvatable (or hydratable) polysaccharide. The fluids used for hydraulic fracturing may also be viscosified or thickened with viscoelastic surfactants. These are non-polymer fluids that are typically formed from surfactants that are either cationic, anionic, zwitterionic, amphoteric or nonionic or employ a combination of such surfactants. In either case, such fracturing fluids are relatively costly due to the expense of the various components and additives used.

Additionally, while the use of such hydraulic fracturing fluids typically improves the overall permeability of the formation by establishing a high-permeability path between the newly-exposed formation and the wellbore, amounts of the viscosified fluids can leak off into the formation and may reduce the relative permeability in the invaded region after the treatment. Cleanup of these fluids is therefore an important consideration, which may add to the cost of treatment. And even with effective cleanup, there is always the potential that some damage will remain.

In some formations, particularly near the fracture, the permeability to gas in some portions of the formation may be close to zero. Such low-permeability formations are often referred to as "tight". The recovery of methane gas from tight subterranean formations has been a particular problem, especially in shales, such as Texas' Barnett Shale. In such formations, fracturing with conventional viscosified fracturing fluids may not be practical due to the expense and risk of damage to the already low permeability of the formation.

One method of stimulating tight shale or sand formations is through water or "slick-water" fracturing. In such fracturing operations, water, which may be combined with a friction reducing agent in the case of slickwater, is introduced into the formation at a high rate to facilitate fracturing the formation. These fracturing fluids may produce longer, although more narrow fractures, and also use lighter weight and significantly lower amounts of proppant than conventional viscosified fracturing fluids. These water fracturing fluids are particularly useful in low-permeable, gas-bearing formations, such as tight-gas shale and sand formations, where fracture width is of less concern. The water or slick-water fracturing fluids may be brine or fresh water, depending upon the properties of the formation being treated. The water fracturing fluids also require less cleanup than conventional viscosified fracturing fluids.

While slickwater fracturing fluids may require less cleanup than conventional viscosified fluids, there is still the possibility of fracture or formation damage from the friction-reducing polymer. Typically, polyacrylamides are used as the friction-reducing polymer. These polymers are synthetic polymers and there is a general perception in the industry that the polyacrylamides are difficult to break to facilitate cleanup.

Accordingly, new and improved slickwater fracturing fluids and methods for breaking the friction reducing polymers used in these fluids to minimize fracture and formation damage are needed.

BRIEF DESCRIPTION OF THE DRAWINGS

For a more complete understanding of the present invention, and the advantages thereof, reference is now made to the following descriptions taken in conjunction with the accompanying figures, in which.

SUMMARY

Figure 1A:
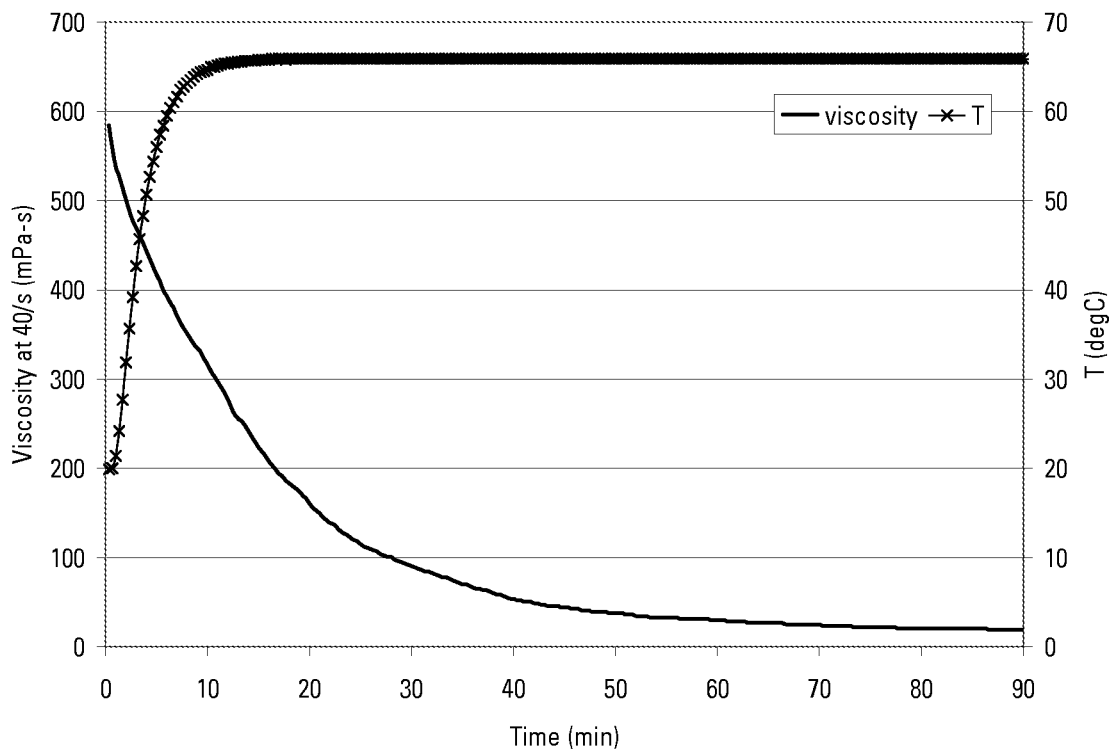
FIG. 1A is a plot of the fluid viscosity at 150° F. (65.6° C.) over time of a 2.4% anionic polyacrylamide polymer solution containing 0.18% surfactant stabilized hydrogen peroxide breaker.

A treatment fluid for treating a subterranean formation penetrated by a wellbore is formed from water and a polyacrylamide in an amount of less than about 5% by weight of the fluid for reducing friction of the fluid. The fluid also contains a stabilized peroxide breaker. The stabilized peroxide breaker may include urea peroxide, percarbonates, persulfates, perborates and hydrates thereof, surfactant-stabilized peroxides, encapsulated peroxides or combinations of these. More specifically, the stabilized peroxide breaker may also include sodium percarbonate, potassium percarbonate, ammonium percarbonate, sodium persulfate, potassium persulfate, ammonium persulfate and sodium perborate.

In certain instances, the treatment fluid may include a biocide and/or a clay stabilizer. The polyacrylamide is present in the treatment fluid in an amount of from about 0.001% to about 5% by weight of the treatment fluid. The polyacrylamide may have an average molecular weight of from about 1000 to about 20 million, or above. The treatment may further include a proppant.

The treatment fluid may be used in a method of treating a subterranean formation penetrated by a wellbore, wherein the treatment fluid is introduced into the formation through the wellbore at a pressure above the fracture pressure of the formation. The method may include treating those subterranean formations formed from shale. In particular, the shale formation may include those having a permeability of less than about 1 mD.

DETAILED DESCRIPTION

The description and examples are presented herein solely for the purpose of illustrating the various embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Some treatment fluids that may be used in treating a subterranean formation utilizes an amount of a polymer or copolymer of acrylamide as a friction reducing agent for slickwater fracturing treatments. Even though these polymers are often called "polyacrylamide", many are actually copolymers of acrylamide and one or more other chemical species. The main consequence is to give the "modified" polyacrylamide some ionic character. The polyacrylamide may also be used as a homopolymer. As used herein, the expression "polyacrylamide" is meant to encompass acrylamide homopolymers and copolymers, or any suitable synthetic form of polyacrylamide, unless expressly stated otherwise or as is apparent from its context. As used herein, "homopolymers" are those polymers containing less than about 0.1% by weight of other comonomers. Combinations or mixtures of homopolymers and copolymers may be used as well. The copolymers may include two or more different comonomers and may be random or block copolymers. The comonomers may include, for example, sodium acrylate. The polyacrylamide polymers and copolymers useful for the invention may include those having an average molecular weight of from about 1000, or lower, to about 20 million, or above, with from about 1 million to about 5 million being typical. Other suitable friction reducers may be used as well; for example vinyl sulfonates (i.e. polyAMPS).

The polyacrylamide may be used in the treatment fluid an amount of from about 0.001% to about 5% by weight of the treatment fluid. In many applications, the polyacrylamide is used in an amount of from about 0.01% to about 0.3% by weight of the treatment fluid. The polyacrylamide may be initially dissolved or disbursed, or other wise packaged, in mineral oil or other liquid carrier to enhance the delivery or mixability prior to its addition to treatment water.

The present invention makes use of stabilized hydrogen peroxide breakers with oxygen-oxygen single bonds in the molecular structure for breaking the polyacrylamide polymer. As used herein, the expression "stabilized peroxide breaker" or "stabilized hydrogen peroxide breaker" refers to those peroxide materials wherein hydrogen peroxide is bound, inhibited, etc. by another compound or molecule(s) prior to its addition to water but that forms or releases hydrogen peroxide in solution when added to water. In some cases, at least about 95%, 96%, 97%, 98%, 99% or 100% of the hydrogen peroxide of the stabilized peroxide breaker is released in solution for reaction. The stabilized peroxide breaker may perform equally or substantially equal with hydrogen peroxide itself, when added in equivalent amounts. In its stabilized form prior to its addition to water, however, the stabilized peroxide breaker is less reactive than hydrogen peroxide itself so that the stabilized peroxide breaker can be more easily and safely handled. This is contrasted with straight hydrogen peroxide or its solution that is less stable and requires a high degree of care when handling. The stabilized peroxide breaker differs and is also contrasted with metal peroxides, such as calcium peroxide, magnesium peroxide and zinc peroxide. Such metal peroxides dissociate when added to water. Such dissociation may occur at a controlled rate such that not all of the peroxide is released or it is released over a significant period of time.

Examples of suitable stabilized peroxide breakers include the adducts of hydrogen peroxide with other molecules, and may include carbamide peroxide or urea peroxide ($CH_4N_2O.H_2O_2$), percarbonates, such as sodium percarbonate ($2Na_2CO_3.3H_2O_2$), potassium percarbonate and ammonium percarbonate. The stabilized peroxide breakers may also include those compounds that undergo hydrolysis in water to release hydrogen peroxide, such sodium perborate or its hydrates.

Hydrogen peroxide or other peroxides that are stabilized with surfactants may also be used as the stabilized peroxide breaker. Other peroxides with which the surfactants may be used may include superoxides and organic peroxides. An example of a commercially available surfactant-stabilized hydrogen peroxide is BIO-ADD 1105, available from Shrieve Chemical Products, The Woodlands, Tex.

The stabilized peroxide breaker may also include peroxides that are encapsulated to facilitate their stabilization. The encapsulation material may be a polymeric enclosure that can release the peroxide in a controllable way. The enclosure may consist of any polymer that can degrade over a period of time to release the chemicals and will typically be chosen depending on the release rate desired. Degradation of the polymer can occur, for example, by hydrolysis, solvolysis, melting, or other mechanisms. The polymers may be selected from homopolymers and copolymers of glycolate and lactate, polycarbonates, polyanhydrides, polyorthoesters, and polyphosphacenes. The encapsulated peroxides may be encapsulated hydrogen peroxide or any of the peroxides described herein, such as superoxides and organic peroxides, that are encapsulated in an appropriate material to inhibit reaction of the peroxide prior to its addition to water.

The stabilized peroxide breaker is used in an amount sufficient to break the polyacrylamide. This may depend upon the amount of polyacrylamide used and the conditions of the treatment. Lower temperatures may require greater amounts of the breaker. In many, if not most applications, the peroxide breaker may be used in an amount of from about 0.001% to about 20% by weight of the treatment fluid, with from about 0.01% to about 5% by weight of the treatment fluid being typical. The stabilized peroxide breaker may be effective in the presence of mineral oil or other hydrocarbon carrier fluid or other commonly used chemicals for use with the polyacrylamide polymer when such fluids are used with the polyacrylamide to dissolve, disperse, degrade, package, or otherwise treat the polyacrylamide prior to its addition to aqueous fluids.

The polyacrylamide and stabilized peroxide breaker, along with any other additives, are combined with an aqueous fluid, which forms the balance of the treatment fluid. The aqueous fluid is typically fresh water, although aqueous fluids with salinity may be used. The water may also be water that is produced from a hydrocarbon-producing formation.

Embodiments of the invention may further contain other additives and chemicals that are known to be commonly used in oilfield applications by those skilled in the art. These include, but are not necessarily limited to, materials such as oxygen scavengers, alcohols, scale inhibitors, corrosion inhibitors, fluid-loss additives, bactericides, clay stabilizers, acids or chelants to dissolve solids downhole, surfactants to reduce capillary pressures or surface tension, and the like. Nonlimiting examples of some suitable scale inhibitor include phosphonate, phosphate esters, and the like. Flowback aids may also be used, such as EZEFLO surfactant, or microemulsion cleanup aids. Any suitable biocides may be used in embodiments of the invention.

The treatment fluid may be used in fracturing tight or low-permeable formations, such as tight shale and sandstone formations (such as low permeability sandstone). Such formations may have a permeability of from about 1 mD or 0.5 mD or less. The treatment fluid is introduced into the formation above the fracture pressure of the formation.

The treatment fluid may be used in fracturing operations without any proppant. In certain embodiments, however, proppant may be included in the treatment fluid to aid in propping the propagated fractures. In such instances, the proppant may be used in relatively small amounts. In treating gas-containing formations, because gases can be produced from formations having very narrow fractures, fracture width is less important than increased surface area provided from the fracturing treatment. Accordingly, the proppant used may have a smaller particle size than those used from conventional fracturing treatments used in oil-bearing formations. Where it is used, the proppant may have a size, amount and density so that it is efficiently carried, dispersed and positioned by the treatment fluid within the formed fractures. Proppants may include sand, bauxite, ceramic and other materials.

The following examples further serve to illustrate the invention. Unless otherwise indicated or apparent from its context, all percentage concentrations presented in the examples are based on weight percent.

EXAMPLES

Example 1

Figure 1B:
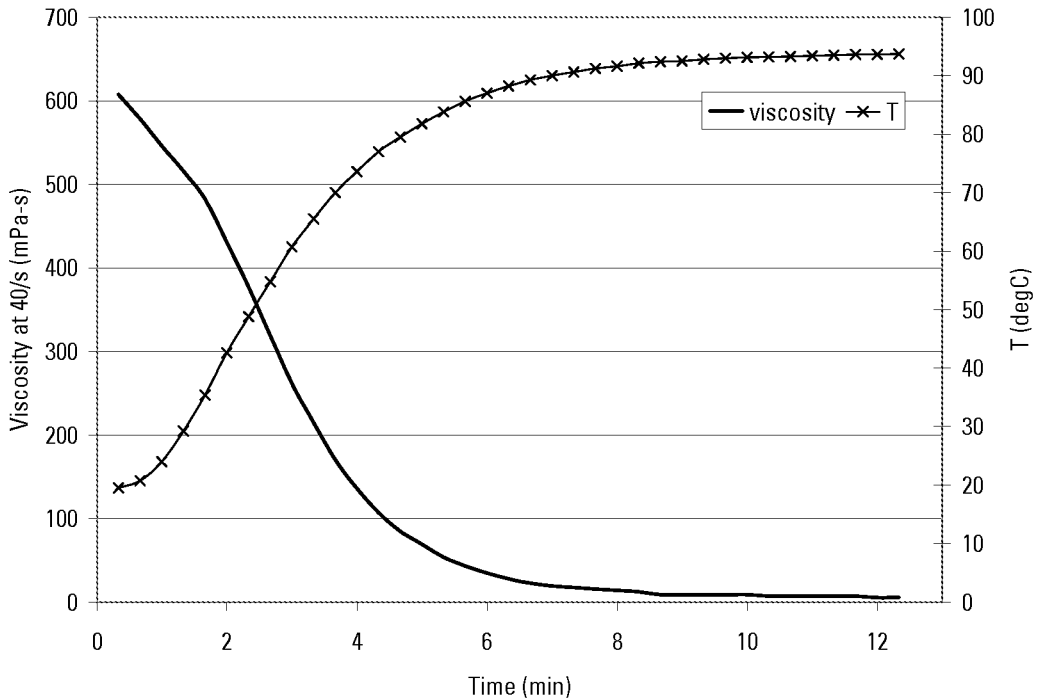
FIG. 1B is a plot of the fluid viscosity at 200° F. (93.3° C.) over time of a 2.4% anionic polyacrylamide polymer solution containing 0.18% surfactant stabilized hydrogen peroxide breaker.

A treatment fluid was prepared using fresh water and 2.4% by weight anionic polyacrylamide polymer. To this was added 0.18% surfactant stabilized hydrogen peroxide breaker, available as BIO-ADD 1105 (containing about 35% the surfactant stabilized hydrogen peroxide), from Shrieve Chemical Products, The Woodlands, Tex. Viscosities of the fluid were measured using a Fann50-type Viscometer at a reduced shear rate of 40 $s^{-1}$ to reduce shear damage to the fluid. Fluid viscosity profiles at 150° F. (65.6° C.) and 200° F. (93.3° C.) were taken for the fluid over time with the results being presented in FIGS. 1A and 1B, respectively. When the amount of the stabilized hydrogen peroxide breaker was increased to 0.36%, the breaking reaction was accelerated. After the measurements, the fluids appeared water-like at room temperature. This suggested that the anionic polyacrylamide polymer had been truly degraded by the action of the stabilized hydrogen peroxide breaker.

Example 2

Figure 2A:
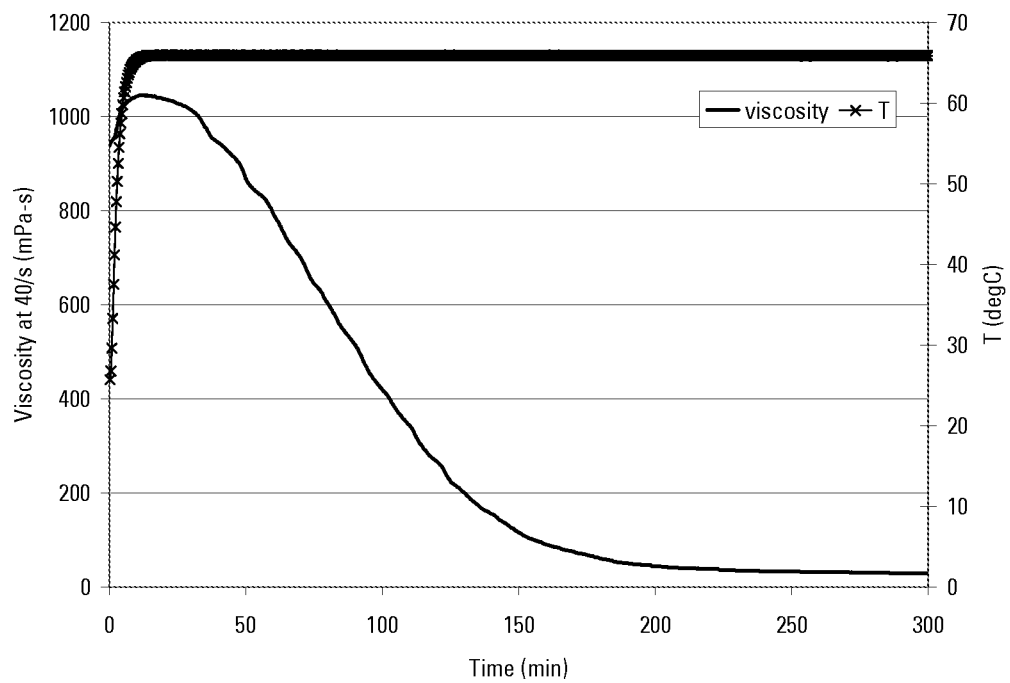
FIG. 2A is a plot of the fluid viscosity at 150° F. (65.6° C.) over time of a 1.5% acrylamide sodium acrylate copolymer solution containing 0.18% surfactant stabilized hydrogen peroxide breaker.
Figure 2B:
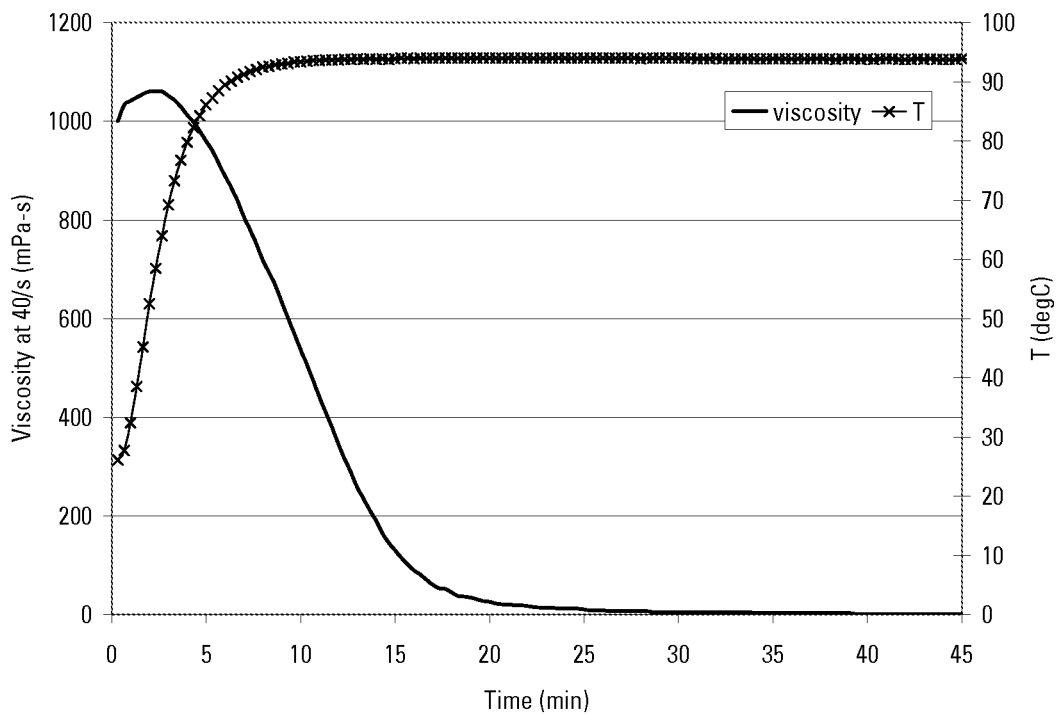
FIG. 2B is a plot of the fluid viscosity at 200° F. (93.3° C.) over time of a 1.5% acrylamide sodium acrylate copolymer solution containing 0.18% surfactant stabilized hydrogen peroxide breaker.

A treatment fluid was prepared with fresh water and 1.5% acrylamide sodium acrylate copolymer. The copolymer had an average molecular weight of about 5 million. After the copolymer was completely hydrated, 0.18% stabilized hydrogen peroxide breaker (BIO-ADD 1105) was added. Viscosities of the fluid were measured using a Fann50-type Viscometer at a reduced shear rate of 40 $s^{-1}$ to reduce shear damage to the fluid. Fluid viscosity profiles at 150° F. (65.6° C.) and 200° F. (93.3° C.) were taken for the fluid over time with the results being presented in FIGS. 2A and 2B, respectively. The fluid broke much faster at 200° F. (93.3° C.) than at 150° F. (65.6° C.). After the measurements, the fluids appeared liquid-like at room temperature, suggesting that they had been truly broken by the stabilized hydrogen peroxide breaker.

Example 3

Figure 3A:
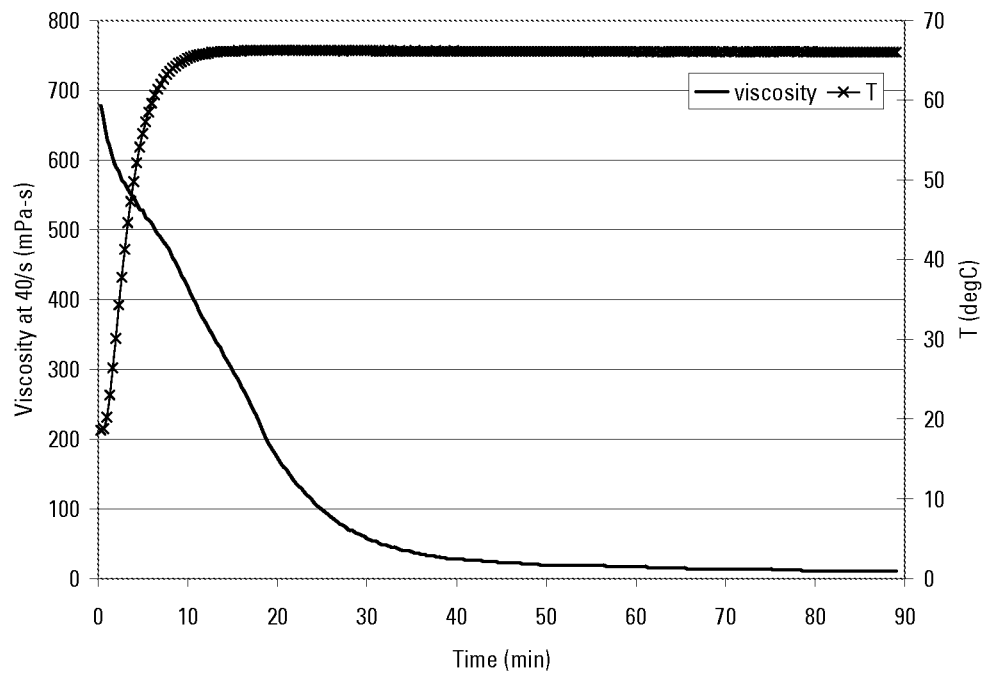
FIG. 3A is a plot of the fluid viscosity at 150° F. (65.6° C.) over time of a 2.4% anionic polyacrylamide polymer solution containing 0.5% carbamide peroxide breaker.
Figure 3B:
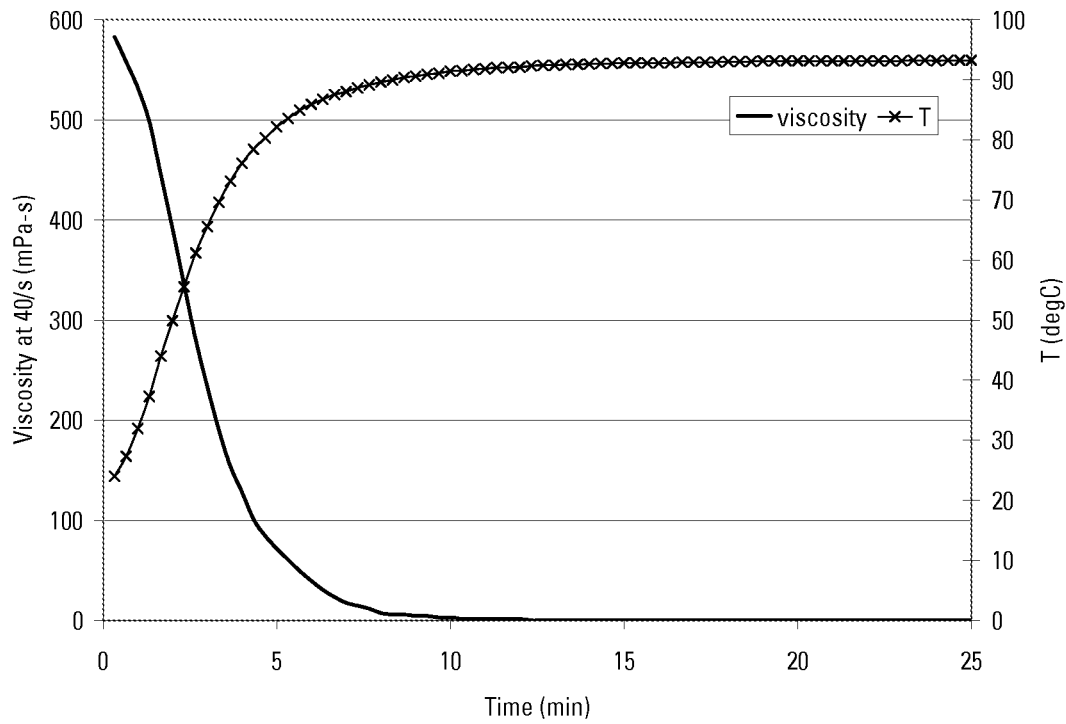
FIG. 3B is a plot of the fluid viscosity at 200° F. (93.3° C.) over time of a 2.4% anionic polyacrylamide polymer solution containing 0.5% carbamide peroxide breaker.

A treatment fluid was prepared using fresh water and 2.4% of the anionic polyacrylamide polymer used in Example 1. To this was added 0.5% carbamide peroxide (urea peroxide) as the breaker. Fluid viscosity profiles at 150° F. (65.6° C.) and 200° F. (93.3° C.) were taken for the fluid over time with the results being presented in FIGS. 3A and 3B, respectively. When the amount of the breaker was increased, for example, to 1%, the breaking reaction was accelerated. After the measurements, the fluids appeared water-like at room temperature. This suggested that the anionic polyacrylamide polymer had been truly degraded by the action of the urea peroxide breaker.

Example 4

Figure 4A:
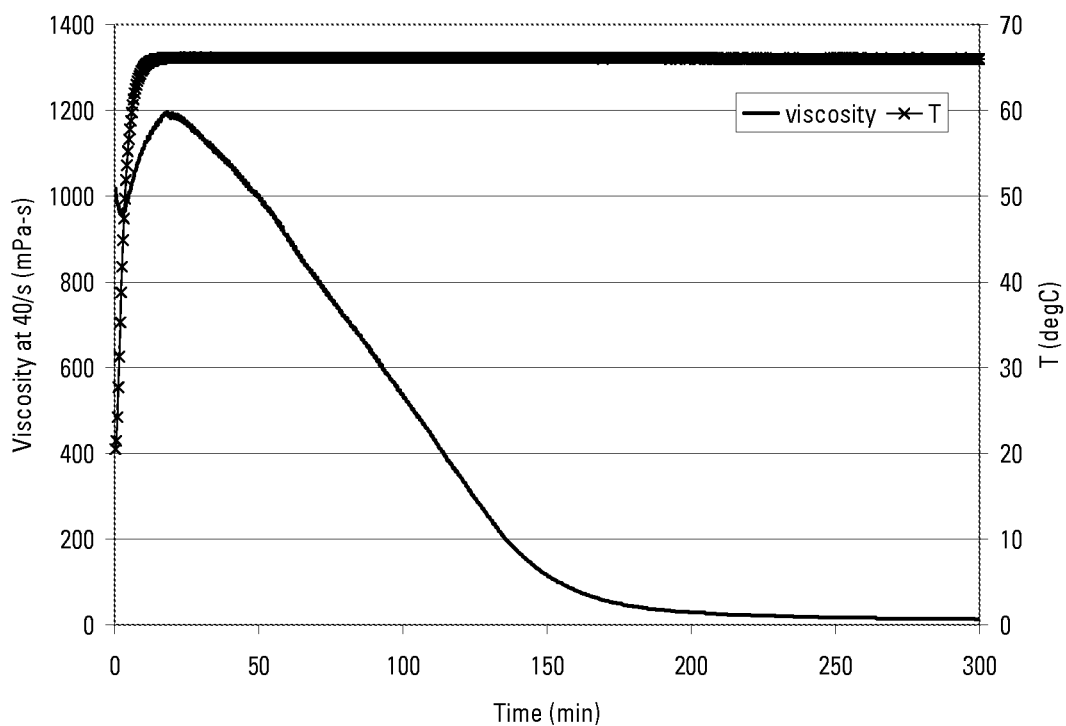
FIG. 4A is a plot of the fluid viscosity at 150° F. (65.6° C.) over time of a 1.5% acrylamide sodium acrylate copolymer solution containing 0.5% carbamide peroxide breaker.
Figure 4B:
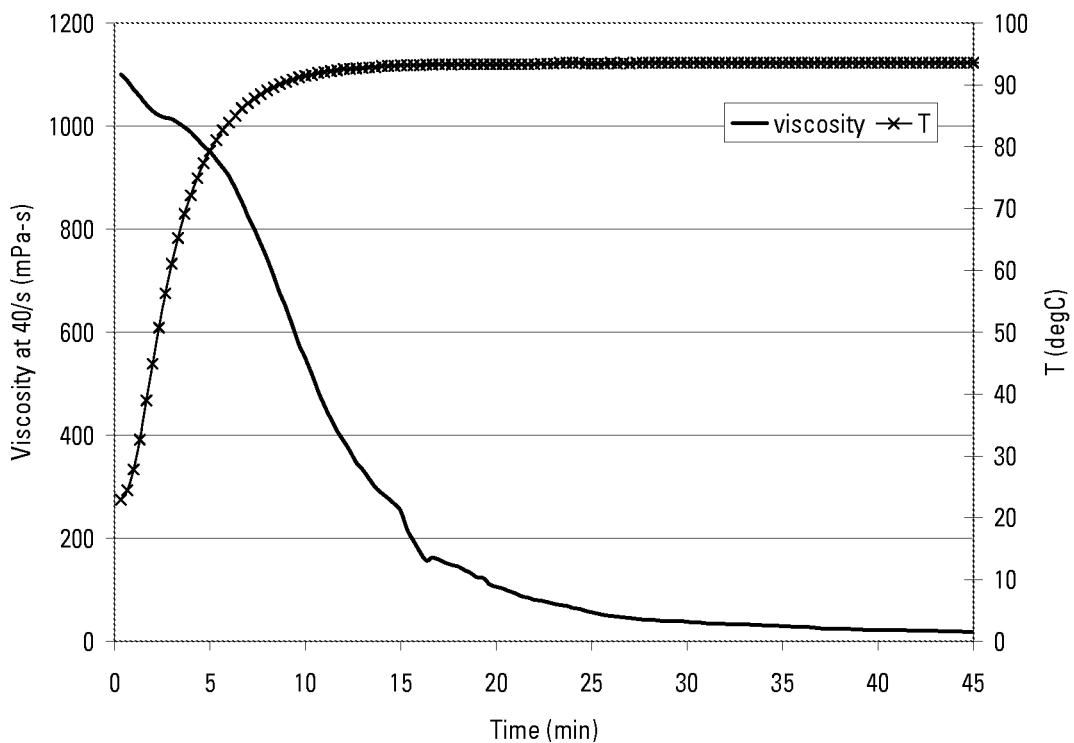
FIG. 4B is a plot of the fluid viscosity at 200° F. (93.3° C.) over time of a 1.5% acrylamide sodium acrylate copolymer solution containing 0.5% carbamide peroxide breaker.

A treatment fluid was prepared with fresh water and 1.5% acrylamide sodium acrylate copolymer used in Example 2. After the copolymer was completely hydrated, 0.5% carbamide peroxide was added as the breaker. Fluid viscosity profiles at 150° F. (65.6° C.) and 200° F. (93.3° C.) were taken for the fluid over time with the results being presented in FIGS. 4A and 4B, respectively. The fluid broke much faster at 200° F. (93.3° C.) than at 150° F. (65.6° C.). After the measurements, the fluids appeared liquid-like at room temperature, suggesting that they had been truly broken by the urea peroxide breaker.

Example 5

Figure 5:
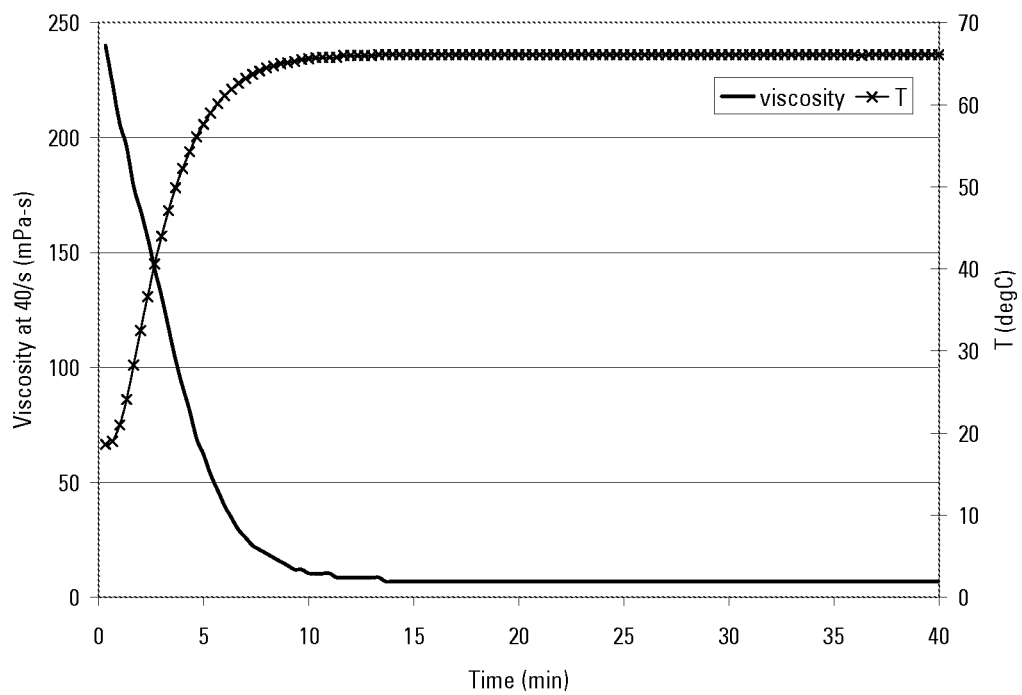
FIG. 5 is a plot of the fluid viscosity at 150° F. (65.6° C.) over time of a 1.2% anionic polyacrylamide solution containing 0.48% sodium percarbonate breaker.

A treatment fluid was prepared with fresh water and 1.2% anionic polyacrylamide polymer, as used in Example 1. After the polymer was completely hydrated, 0.48% sodium percarbonate was added as the breaker. A fluid viscosity profile at 150° F. (65.6° C.) was taken for the fluid over time with the results being presented in FIG. 5. The figure shows that the sodium percarbonate is an effective breaker for the anionic polyacrylamide polymer. The breaking speed may be affected by such factors as the breaker concentration, fluid temperature, and/or the chemical nature of the polyacrylamide polymer.

Example 6

Figure 6:
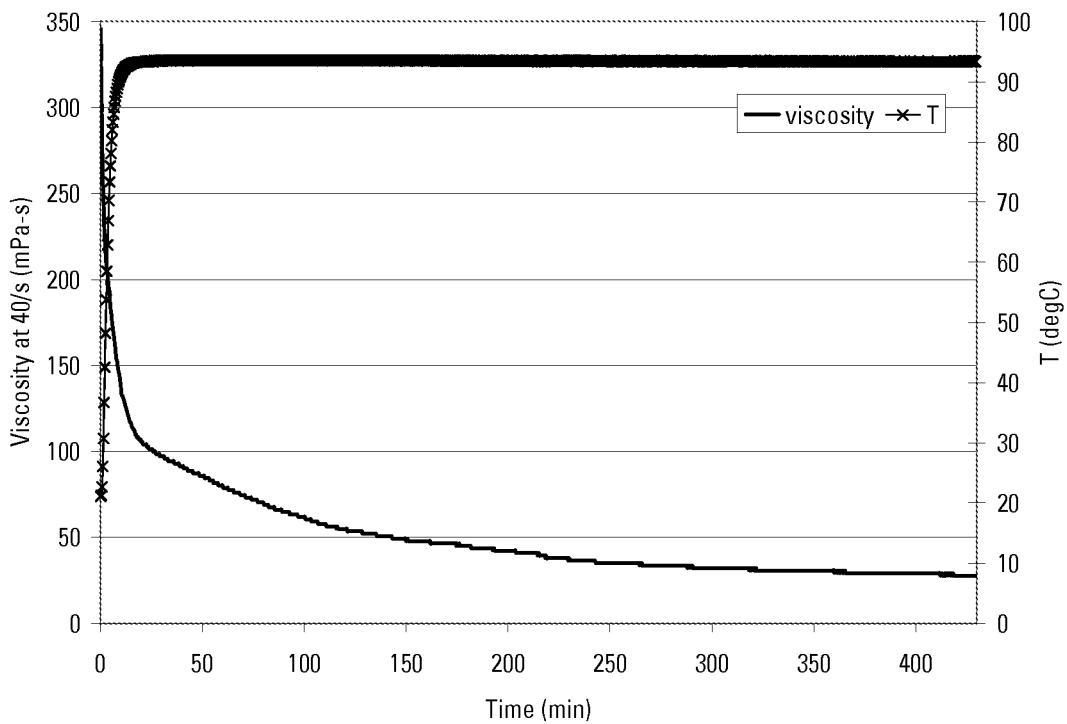
FIG. 6 is a plot of the fluid viscosity at 200° F. (93.3° C.) over time of a 0.75% acrylamide sodium acrylate copolymer solution containing 0.72% sodium percarbonate breaker.

A treatment fluid was prepared with fresh water and 0.75% acrylamide sodium acrylate copolymer, as used in Example 2. After the polymer was completely hydrated, 0.72% sodium percarbonate was added as the breaker. A fluid viscosity profile at 200° F. (93.3° C.) was taken for the fluid over time with the results being presented in FIG. 6. The figure shows that the sodium percarbonate is an effective breaker for the copolymer. The breaking speed may be affected by such factors as the breaker concentration, fluid temperature, and/or the chemical nature of the polyacrylamide copolymer.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
    forming treatment fluid comprising water, a polyacrylamide in an amount of 0.001% to about 5% by weight of the fluid for reducing friction of the fluid and a stabilized peroxide breaker; and
    introducing the treatment fluid into the formation through the wellbore at a pressure above the fracture pressure of the formation,
    wherein the stabilized peroxide breaker is selected from a group consisting of sodium percarbonate, potassium percarbonate, ammonium percarbonate, sodium persulfate, ammonium persulfate, sodium perborate, a surfactant-stabilized peroxide, an encapsulated peroxide or combinations of these.

2. The method of claim 1, wherein the stabilized peroxide breaker is present in the fluid in an amount of from about 0.001% to 20% by weight of the fluid.

3. The method of claim 1, wherein the treatment fluid further comprises at least one of a biocide, an acid, a caustic solution and a clay stabilizer.

4. The method of claim 1, wherein the polyacrylamide is present in the treatment fluid in an amount of from about 0.01% to about 0.3% by weight of the treatment fluid.

5. The method of claim 1, wherein the polyacrylamide has an average molecular weight of from about 1000 to about 20 million.

6. The method of claim 1, wherein the treatment fluid further comprises a proppant.

7. The method of claim 1, wherein the subterranean formation is a shale formation, low permeability sandstone, or combination of both.

8. The method of claim 7, wherein the formation has a permeability of less than about 1 mD.

9. The method of claim 1 wherein the stabilized peroxide breaker effectively degrades the polyacrylamide.

10. A method of treating a subterranean formation penetrated by a wellbore, the method comprising:
    forming treatment fluid comprising water, a vinyl sulfonate in an amount of less than about 5% by weight of the fluid for reducing friction of the fluid and a stabilized peroxide breaker; and
    introducing the treatment fluid into the formation through the wellbore at a pressure above the fracture pressure of the formation,
    wherein the stabilized peroxide breaker is selected from a group consisting of sodium percarbonate, potassium percarbonate, ammonium percarbonate, sodium persulfate, ammonium persulfate, sodium perborate, a surfactant-stabilized peroxide, an encapsulated peroxide or combinations of these.

11. The method of claim 10 wherein the stabilized peroxide breaker effectively degrades the vinyl sulfonate.

* * * * *